United States Patent [19]

Heinz et al.

[11] Patent Number: 5,102,935

[45] Date of Patent: Apr. 7, 1992

[54] FREE-FLOWING POLYAMIDE MOLDING COMPOUNDS AND BLENDS

[75] Inventors: Hans-Detlef Heinz; Harald Pielartzik, both of Krefeld; Aziz El-Sayed, Leverkusen; Rolf-Volker Meyer, Krefeld; Martin Wandel; Peter-Roger Nyssen, both of Dormagen, all of Fed. Rep. of Germany

[73] Assignee: Bayer Aktiengesellschaft, Leverkusen, Fed. Rep. of Germany

[21] Appl. No.: 403,133

[22] Filed: Sep. 5, 1989

[30] Foreign Application Priority Data

Sep. 13, 1988 [DE] Fed. Rep. of Germany ....... 3831121
Apr. 28, 1989 [DE] Fed. Rep. of Germany ....... 3914048

[51] Int. Cl.⁵ .............................................. C08K 5/20
[52] U.S. Cl. .................................. 524/219; 524/293; 524/299; 524/447; 524/449; 524/451; 524/494; 524/496; 524/497
[58] Field of Search ............... 524/190, 219, 237, 293, 524/299, 451

[56] References Cited

U.S. PATENT DOCUMENTS 4,451,611 6/1984 Cincotta et al. ..................... 525/51
4,611,025 9/1986 Akkapeddi et al. ................ 524/451
4,650,836 9/1987 George et al. ...................... 525/444
4,791,187 3/1988 Suling et al. .......................... 528/60

FOREIGN PATENT DOCUMENTS 5082150 6/1980 Japan .................................. 524/293

*Primary Examiner*—Paul R. Michl
*Assistant Examiner*—Yong S. Lee
*Attorney, Agent, or Firm*—Connolly & Hutz

[57] ABSTRACT

The invention relates to new, free-flowing polyamide molding compounds and blends, characterized in that they are prepared by mixing of polyamides known per se in the melt with low molecular weight, liquid-crystalline esters and/or ester amides corresponding to formula (I) and/or liquid-crystalline, oligomeric esters and/or ester amides corresponding to formula (II) and, optionally, other additives, at least one polymeric blending component being used as a further additive in the case of polyamide blends, and to the use of these liquid-crystalline (LC) additives I and/or II as flow promoters in polyamide molding compounds and blends and to a process for the production of the new polyamide molding compounds and blends. The invention also relates to the new oligomeric esters and/or ester amides corresponding to formula (II).

8 Claims, No Drawings

FREE-FLOWING POLYAMIDE MOLDING COMPOUNDS AND BLENDS

This invention relates to new, free-flowing polyamide molding compounds and blends which are characterized in that they are prepared by mixing of polyamides known per se in the melt with low molecular weight, liquid-crystalline esters and/or ester amides corresponding to formula (I) and/or liquid-crystalline, oligomeric esters and/or ester amides corresponding to formula (II) and, optionally, other additives, at least one polymeric blending component being used as a further additive in the case of polyamide blends, and to the use of these liquid-crystalline (LC) additives I and/or II as flow promoters in polyamide molding compounds and blends and to a process for the production of the new polyamide molding compounds and blends. The invention also relates to the new oligomeric esters and/or ester amides corresponding to formula (II).

Polyamides are a class of polymers which have been successfully used for several years for a number of practical applications. They may be produced by various processes and may be synthesized from various polyamideforming components. For special applications, they may be processed either individually or even in combination with processing aids, polymeric blending components or even mineral reinforcing materials (for example fillers or glass fibers) to form materials having special combinations of properties. Thus, polyamides are industrially used in large quantities for the production of fibers, moldings and films and also, for example, as hotmelt adhesives and auxiliaries in a variety of applications.

A very large percentage of the various polyamide molding compounds is processed by injection molding, i.e. the polyamide is melted and introduced under pressure into a mold in which it solidifies on cooling. Flowability plays a key role in this regard. The more easily a polyamide melt flows, the better the mold can be filled. This is of paramount important above all in the case of very thin-walled moldings.

Whereas partially crystalline polyamides of average molecular weight show good flow properties, these good flow properties deteriorate rapidly with increasing molecular weight on account of the considerable increase in melt viscosity during the transition to relatively high molecular weight polyamides. In view of the fact that the mechanical properties of polyamides, particularly their impact strength, become even better with increasing molecular weight, this deterioration in flowability seriously restricts their potential applications.

In contrast to partially crystalline aliphatic polyamides, amorphous polyamides show very high melt viscosities and correspondingly poor flow, even for relatively low molecular weights, particularly when their glass temperatures are above about 150° C. Accordingly, they are difficult to process in this case, too.

It is known that particularly crystalline polyamides take up different quantities of water, depending on their structure. This leads to an increase in impact strength, but to a reduction in rigidity because the water acts as a plasticizer.

Accordingly, inorganic reinforcing materials, for example glass fibers or mineral fillers, have long been incorporated in polyamides to increase their rigidity.

However, the increase in rigidity, hardness, heat resistance and dimensional stability achieved with inorganic reinforcing materials is generally offset by disadvantages, particularly a reduction in flow, above all in the case of fibrous reinforcing materials, which makes the polyamides difficult to process.

The effect of the reduction in flow is that more and more injection points are required to fill the mold, particularly in the case of moldings of large surface area, in other words the molds become increasingly more expensive. As a result, there is also an increase in the number of unwanted weld lines which can impair the appearance and mechanical performance properties of the moldings In addition, it becomes very difficult to produce satisfactory surface qualities and thin-walled moldings.

Accordingly, it would be of considerable technological significance if the flowability of the above-mentioned polyamides could be drastically improved.

Polyamide blends show different properties from pure polyamides, depending on the type of polymeric blending component, and are therefore particularly valuable materials.

High-impact polyamides, for example, are well-known blends. High-impact polyamides are two-phase polymer blends which contain special elastomeric components to increase the impact strength or notched impact strength of polyamides in the freshly molded state or even at low temperatures. Examples of such blending components are, for example, diene and acrylate rubbers, EPDM, ethylene/ acrylic acid copolymers and others of the type described in large numbers in the prior art.

Reinforcing materials may be present in addition to the elastomer modifier. In blends such as these, therefore, both impact strength and rigidity are increased in relation to unmodified polyamides.

Another large group of polyamide blends contains, for example, amorphous thermoplastics which show an increased glass temperature and rigidity in relation to standard polyamides. This reduces the water uptake of the polyamides and increases their heat resistance (as measured for example by the heat distortion temperature (HDT)) and rigidity. Examples of blending components of this type are polystyrene, ABS, polycarbonate, aromatic polyester (carbonates), polyphenylene oxides, polymethyl methacrylate, polyether sulfones, etc. These blends may also contain impact modifiers.

Blends of polyamides with partially crystalline thermoplastics are also known.

However, the disadvantage is that these polyamide blends also generally show greatly reduced flow in relation to the pure polyamide component which makes them difficult to process. This applies in particular where the blends additionally contain reinforcing materials.

Accordingly, it would also be of considerable technological importance to these materials if their flowability could be distinctly increased to make them easier to process into high-quality moldings. The processing temperature could also be reduced in this way. This would have a positive effect above all on blends containing rubber modifiers.

It has now surprisingly been found that Special liquid-crystalline, low molecular weight and/or oligomeric additives (I and/or II) produce a drastic increase in the flowability of polyamide molding compounds and polyamide blends, even when added to the polyamides in very small quantities. In addition, a number of mechanical properties and, in some cases, heat resistance can also be improved by this measure. In addition, the water uptake of the polyamides, their crystallization rate and their degree of crystallization may also be increased by this measure, resulting in improved dimensional stability of moldings and longer processability of opened containers and, in some cases, shorter cycle times.

Accordingly, the present invention relates to new, free-flowing polyamide molding compounds and blends, characterized in that they are prepared by mixing of 1) 85 to 99.9% by weight polyamides known per se with 2) 0.1 to 15% by weight, preferably 0.3 to 8% by weight and more preferably 0.5 to 5% by weight of low molecular weight, liquid-crystalline esters and/or ester amides ("LC flow promoters") corresponding to general formula (I)

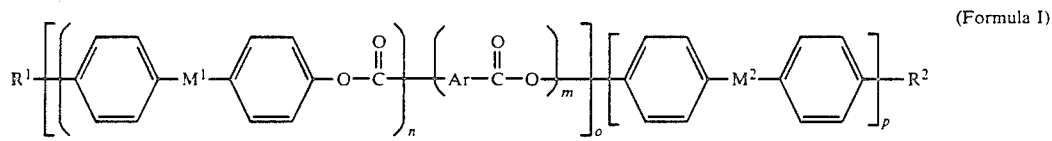

(Formula I)

in which
- —Ar is a $C_{6-20}$ aromatic radical which may be mononuclear or polynuclear, and wherein the polynuclear radical may be attached by a bond or fused,
- $R^1$ and $R^2$ may be the same or different and represent H, chlorine, —O—$C_{1-4}$ alkyl, —O—$C_{3-6}$ cycloalkyl, —O—$C_{6-14}$ aryl, $C_{1-4}$ alkyl, $C_{3-6}$ cylcoalkyl, $C_{6-14}$ aryl, fluorinated $C_{1-4}$ alkyl, fluorinated $C_{3-6}$ cycloalkyl, fluorinated $C_{6-14}$ aryl or a radical corresponding to formulae (1)/a) to 1)

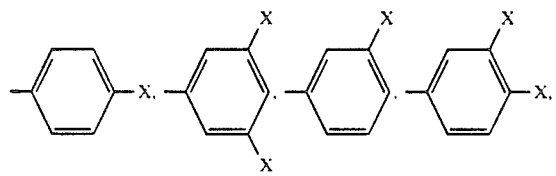

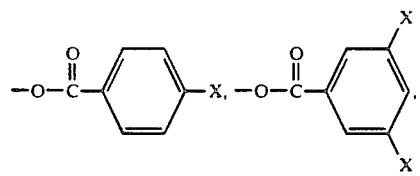

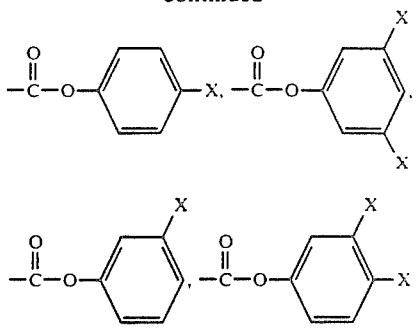

(radicals—(1.a)—(1.1) corresponding to their sequence), where
X has the meanings defined above for $R^1$ to $R^2$ from H to fluorinated $C_{6-14}$ aryl;
—$M^1$ and —$M^2$ may be the same or different and represent radicals with two bonds corresponding to formulae I.1) to I.11)

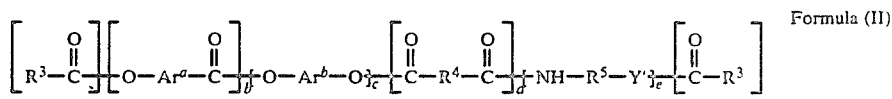

(formulae (I.1)—(I.11) corresponding to their sequence),
m=0, 1 or 2,
n=1 or 2,
o=1, 2, 3 or 4 and
p=0 or 1 where, when p=0,
$R^2$ can only be (1a), (1b), (1c) or (1d), and/or liquid-crystalline oligomeric esters and/or ester amides corresponding to formula (II) with statistical distribution of the structural units

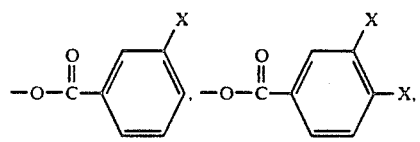

Formula (II)

in which
$R^3$ is an alkyl radical, preferably a methyl radical, or an optionally substituted, preferably mono- or disubstituted, aryl radical, preferably a phenyl radical,

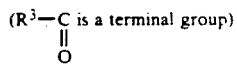
(R³—C is a terminal group)

Arᵃ is a difunctional, optionally substituted (substituents as in R³) mononuclear or polynuclear aromatic radical containing 6 to 24 carbon atoms; the polynuclear radical may be directly attached or even fused, Arᵇ is a difunctional, optionally substituted, mononuclear or polynuclear aromatic radical containing 6 to 30 carbon atoms; the polynuclear radical may be attached in different ways;

R⁴ and R⁵ represent an alkyl radical containing 0 to 40 (R⁴) or 3 to 40 (R⁵) carbon atoms or R⁴ and R⁵ may represent a cycloaliphatic radical containing 5 to 15 carbon atoms or have the meaning of an optionally substituted, difunctional, mononuclear or polynuclear aromatic radical containing 6 to 24 carbon atoms; the polynuclear radical may be attached differently by a bond or even by fusion, Y' represents

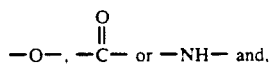

in the case of attachment to a terminal group

represents the radicals —O— or —NH—, and
b = 0 to 10, preferably 0 to 8 and more preferably 0 to 4,
c = 1 to 9, preferably 1 to 7, more preferably 1 to 4,
d = 0 to 9, preferably 0 to 7 and more preferably 0 to 3,
e = 0 to 3 and preferably 0 to 2 and in which the terminal groups are formed by structural elements of the type

the average molecular weight $\overline{M}_n$ of the compounds corresponding to formula (II) being no greater than 4000 and preferably no greater than 2500, and, optionally, 3) from 0.001 to 150% by weight, based on the total weight of components 1) and 2), of standard additives; the additives may as well already be completely or partly present in the polyamides mentioned under 1).

Compounds corresponding to formula (I)

Particularly preferred groups -Ar- of formula (I) and groups Arᵃ and Arᵇ of formula (II) are the groups (Ar1) to (Ar4)

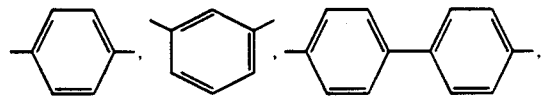

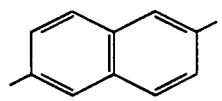

(Ar1)-(Ar4), corresponding to their sequence

Preferred substituents R¹ and R² are H, CH₃, OCH₃, cyclohexyl, phenyl, CF₃, OCF₃, fluorinated cyclohexyl and fluorinated phenyl.

Preferred groups —M— are those corresponding to formulae (I.1), (I.2), (I.5), (I.8), (I.9) and (I.11).

Preferred index combinations m, n, o, p and q are
m = 0, n = 1, o = 1, p = 0;
m = 0, n = 2, o = 1, p = 1;
m = n = o = p = 1;
m = 1, n = 1, o = 2, p = 1;
m = 0, n = 2, o = 1, p = 0;
m = 1, n = 2, o = 1, p = 1 and
m = 1, n = 1, o = 3, p = 1.

The compounds corresponding to formula (I) are distinguished by the fact that, on melting, they pass through a liquid crystalline phase. (For liquid crystalline compounds and phases, see for example D. Demus, L. Richter, Textures of Liquid Crystals, Verlag Chemie, Weinheim - New York, 1978, or H. Kelker, R. Hatz, Handbook of Liquid Crystals, Verlag Chemie, Weinheim, Deerfield 1980).

Preferred compounds of formula (I) are those which contain 3 to 25 aromatic partial structures, the group —Ar— being selected as a partial structure irrespective of whether it is mononuclear or polynuclear. Particularly preferred compounds of formula (I) are those which contain 4 to 15 aromatic partial structures, the group —Ar— again being selected as an aromatic partial structure irrespective of whether it is mononuclear or polynuclear. Especially preferred compounds of formula (I) are those which contain 4 to 10 aromatic partial structures as defined above.

The following four groups of compounds (I,A) to (I,D) are mentioned as examples of compounds corresponding to formula (I): (I,A) liquid crystalline compounds corresponding to formula (I) containing three aromatic partial structures, in which
m = 0, n = 1, o = 1 and p = 0,
compounds 1 and 2 already being known from the literature (D. B. Schroeder, J. Org. Chem. 38, 3160 (1973) and J. P. Van Meten, B. H. Klanderman, Mol. Cryst., Liquid Cryst. 1973, Vol. 22, pages 285 et seq.)

(Formula IA)

R¹—⌬—M¹—⌬—O—C(=O)—R²

| No. | R¹ | M¹ | R² |
|---|---|---|---|
| 1 | CH₃ | —C(=O)—O— | ⌬—OCH₃ |
| 2 | CH₃O— | —O—C(=O)— | ⌬—OCH₃ |

(Formula IA)

R¹—⟨phenyl⟩—M¹—⟨phenyl⟩—O—C(=O)—R²

| No. | R¹ | M¹ | R² |
|---|---|---|---|
| 3 | CH₃O— | —O—C(=O)— | —⟨phenyl⟩—CH₃ |
| 4 | CH₃ | —O—C(=O)— | —⟨phenyl⟩—OCH₃ |

(I,B) liquid crystalline compounds corresponding to formula (I) containing four aromatic partial structures, in which again m=0, n=1, o=1 and p=0:

(Formula IB)

R¹—⟨phenyl⟩—M¹—⟨phenyl⟩—O—C(=O)—R² where R² = X¹—⟨phenyl⟩—C(=O)—O—C(=O)—O—⟨phenyl⟩—X²

| No. | | |
|---|---|---|
| 5 | X¹ = H | X² = H |
| 6 | CH₃ | CH₃ |
| 7 | OCH₃ | OCH₃ |
| 8 | CF₃ | CF₃ |
| 9 | Cl | Cl |

(I,C) liquid crystalline compounds corresponding to formula (I) containing five aromatic partial structures, in which
m = n = o = p = 1.

Compound 10 has already been mentioned in the literature, cf. V. N. Tsvetkov, Eur. Polym. J. Vol. 21 no. 11, page 933 (1985).

(Formula IC)

R¹—⟨phenyl⟩—M¹—⟨phenyl⟩—O—C(=O)—Ar—C(=O)—O—⟨phenyl⟩—M²—⟨phenyl⟩—R²

| No. | R¹ | M¹ | M² | R² | Ar |
|---|---|---|---|---|---|
| 10 | H | —O—C(=O)— | —C(=O)—O— | H | —⟨phenyl⟩— |
| 11 | CH₃ | " | " | CH₃ | " |
| 12 | OCH₃ | " | " | OCH₃ | " |
| 13 | H | —C(=O)—O— | —O—C(=O)— | H | " |
| 14 | CH₃ | " | " | CH₃ | " |
| 15 | OCH₃ | " | " | OCH₃ | " |

(I,D) liquid crystalline compounds corresponding to formula (I) containing seven aromatic partial structures, in which m=n=o=p=1:

(Formula ID)

R¹—⟨phenyl⟩—M¹—⟨phenyl⟩—O—C(=O)—Ar—C(=O)—O—⟨phenyl⟩—M²—⟨phenyl⟩—R²

| No. | R¹ | M¹ | Ar | M² | R² |
|---|---|---|---|---|---|
| 16 | H₃C—⟨phenyl⟩—C(=O)—O— | —C(=O)—O— | —⟨phenyl⟩— | —O—C(=O)— | —O—C(=O)—⟨phenyl⟩—CH₃ |
| 17 | ⟨phenyl⟩—C(=O)—O— | —C(=O)—O— | —⟨phenyl⟩— | —O—C(=O)— | —O—C(=O)—⟨phenyl⟩ |
| 18 | ⟨phenyl⟩—O—C(=O)— | —O—C(=O)— | —⟨phenyl⟩— | —C(=O)—O— | —C(=O)—O—⟨phenyl⟩ |
| 19 | CH₃—⟨phenyl⟩—O—C(=O)— | —O—C(=O)— | —⟨phenyl⟩— | —C(=O)—O— | —C(=O)—O—⟨phenyl⟩ |

Particularly preferred compounds corresponding to formula (I) are those which contain from 4 to 15 aromatic partial structures, the group —Ar— being selected as a partial structure irrespective of whether it is mononuclear or polynuclear. Especially particularly preferred compounds corresponding to formula (I) are those which contain from 4 to 10 aromatic partial structures, the group —Ar— again being selected as an aromatic partial structure irrespective of whether it is mononuclear or polynuclear.

In purely formal terms, the compounds corresponding to formula (I) may be produced from the following structural elements (A) to (F):

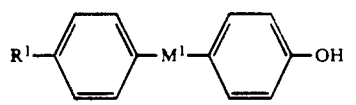
(A)

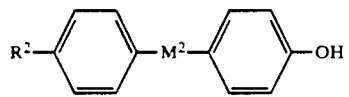
(B)

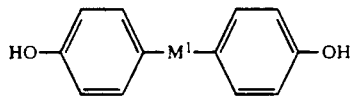
(C)

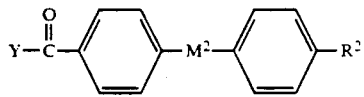
(D)

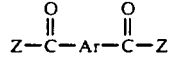
(E)

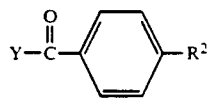
(F)

In formulae (A) to (F), $M^1$, $M^2$ and Ar are as defined for formula (I) and $R^1$ and $R^2$ are also as defined for formula (I); $R^1$ and $R^2$ may additionally have the function of a readily removable protective group such as, for example,

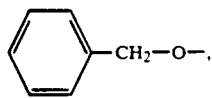

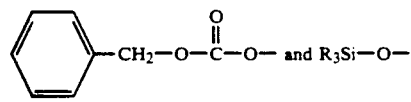

Y and Z are reactive residues of aromatic carboxylic acid derivatives, for example Cl, Br or anhydride groups. Reactive in this context means the ability of the carboxylic acid derivatives to form esters with phenols or phenolates.

In addition to the defined function of a reactive residue in the production of intermediate stages, Y may also be a readily removable protective group, for example

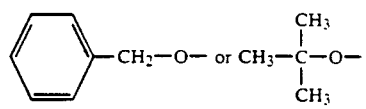

In more specific terms, the compounds of formula (I) according to the invention are prepared by reaction of the phenolic compounds (A) and/or (B) and/or (C) or alkali salts thereof with the reactive derivatives of aromatic carboxylic acids (D) and/or (E) and/or (F); these esterification reactions may be carried out by known methods, for example in accordance with Houben-Weyl, Methoden der organischem Chemie, Supplementary Volume E5.

These esterification reactions are preferably carried out in a basic medium, suitable bases being in particular alkali metal hydroxides, such as sodium or potassium hydroxide, alkali metal carbonates or hydrogen carbonates, such as sodium carbonate, sodium hydrogen carbonate, potassium carbonate or potassium hydrogen carbonate, alkali metal acetates, such as sodium or potassium acetate, alkaline earth metal hydroxides, such as calcium hydroxide, or organic bases, such as triethylamine, diisopropyl ethylamine, 1,8-bis-(dimethylamino)-naphthalene, pyridine, lutidine, collidine, quinoline or N,N-dimethylaniline.

The esterifications are advantageously carried out in the presence of an inert solvent. Particularly suitable inert solvents are ethers, such as diethylether, di-n-butylether, tetrahydrofuran, dioxane or anisole; ketones, such as acetone, butanone, 3-pentanone or cyclohexanone; amides, such as dimethyl formamide or hexamethylphosphoric acid triamide; hydrocarbons, such as benzene, toluene or xylene; halogenated hydrocarbons, such as carbon tetrachloride or tetrachloroethylene; and sulfoxides, such as dimethyl sulfoxide or sulfolan. An excess of the organic base used, for example pyridine, quinoline, N,N-dimethylaniline or triethylamine, may also occasionally be used as solvent for the esterification. In principle, the esterification reactions according to the invention may also be carried out in the absence of the auxiliary base, for example simply by heating the components in an inert solvent.

The reaction temperature is normally in the range from −50° C. to +200° C. and preferably in the range from −20° C. to +160° C. At these temperatures, the esterification reactions are generally over after 15 minutes to 48 hours.

Further production data can be found in Applicants' German patent application P 38 24 365.2. Accordingly, the compounds corresponding to formula (I) are prepared by esterification of phenolic compounds corresponding to formulae (A) and/or (B) and/or (C) or alkali salts thereof in known manner with reactive derivatives of aromatic carboxylic acids corresponding to formulae (D) and/or (E) and/or (F) in dependence upon the functionality of the reactants (A) to (F), taking into account the protective groups to be used, and in dependence upon the values to be obtained for the indices "m", "n", "o" and "p" in formula (I).

In one preferred embodiment of the production of (I), the phenolic compounds are suspended in an organic solvent, for example in diethylether, dioxane, tetrahydrofuran or $CH_2Cl_2$, with an equimolar quantity of organic base, for example triethylamine, pyridine or N,N-dimethylaniline, and the corresponding aromatic carboxylic acid halide, preferably the corresponding aromatic carboxylic acid chloride, is added dropwise with stirring in the calculated quantities to the resulting suspension at temperatures in the range from −10° C. to +10° C. The reaction mixture is then stirred for about 10 to 16 hours at around 20° C., the organic solvent is removed in vacuo and, to separate the hydrohalides of the organic bases, the residue is taken up in water, the product is filtered under suction and then washed with water until a neutral reaction is obtained.

In another variant of the process according to the invention, the phenolic compounds are dissolved in equimolar quantities of 10% aqueous NaOH or KOH solution, the corresponding aromatic carboxylic acid halide is added with cooling in the calculated quantities, the reaction product precipitated is filtered off under suction, washed with water until neutral and dried.

The phenolic compounds corresponding to formula (II) are either known from the literature (see for example J. B. Schroeder, J. Org. Chem. 38, 3160 (1973) and J. P. von Meter, B. H. Klandermann, Mol. Cryst. Liquid Cryst. 1973, 22, 285) or may be obtained by known methods, for example as follows:

$M^{1/2} = -COO-$

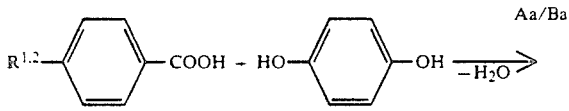

Aa/Ba

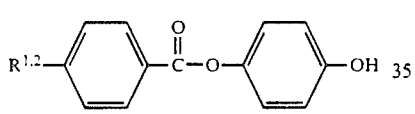

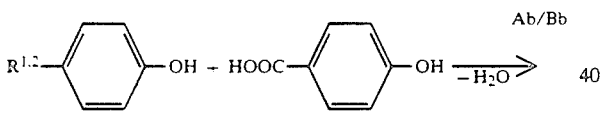

Ab/Bb

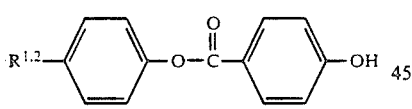

These direct esterification reactions are carried out in a solvent suitable as water entraining agent using acidic catalysts by methods known from the literature (cf. for example Houben-Weyl, Methoden der organischen Chemie, Supplementary Volume E5). Suitable solvents are, for example, toluene, xylene, chlorobenzene, dichlorobenzene.

$M^{1/2} = -CO-NH-$

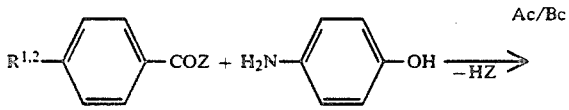

Ac/Bc

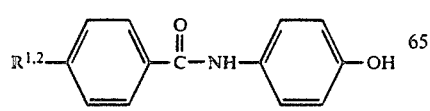

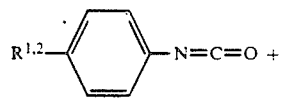

Ad/Bd

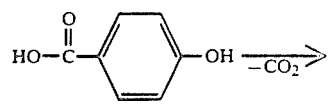

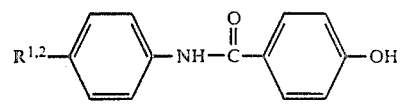

Production methods are descried, for example, by M. Ueda in J. Org. Chem. 50, 760.

In special cases, it is advisable to block the phenolic OH group by a protective group.

Suitable methods for carrying out of the amideforming reaction and also the blocking of phenolic OH groups are descried in the literature, for example in Houben-Weyl, Methoden der organischen Chemie, or W. R. Krigbaum in Eur. Polym. J. Vol. 20, 225 (1984).

The reaction of isocyanates and carboxylic acids is also known and is described in Houben-Weyl, Methoden der organischen Chemie E5.

$M^{1/2} = -CH=N-$

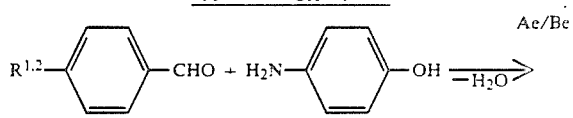

Ae/Be

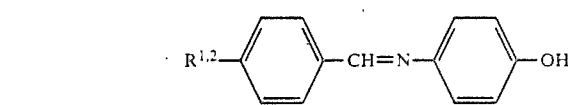

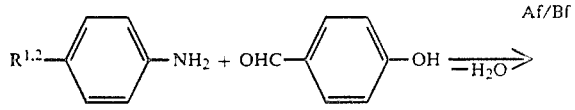

Af/Bf

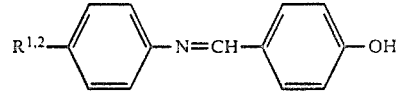

The synthesis of aldimintes by condensation of amines with aldehydes is known from the literature and is described in Houben-Weyl, Methoden der organischen Chemie.

Compound (C) is prepared by direct esterification of p-hydroxybenzoic acid with hydroquinone in accordance with.

The reactive derivatives of the aromatic carboxylic acids (D) are prepared as follows:

$M^2 = -COO-$ (Da)

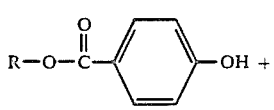

-continued
$M^2 = -COO-$

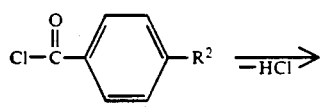

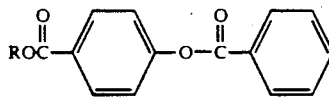

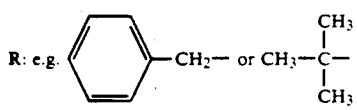

Another synthesis route comprises 1) elimination of the protective group R by hydrogenation or thermolysis and 2) conversion of the free carboxyl group into a reactive form $$Y-\overset{O}{\underset{\|}{C}}- \text{ or } Z-\overset{O}{\underset{\|}{C}}- \text{ by methods known from the literature.}$$

$M^2 = -NH-CO-$

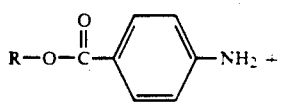

The further synthesis route corresponds to that for compound (Da).

R has the same meaning as in (Da). In addition, the production of (Db) is described in O. Exner, Coll. Czech. Chem. Commun, 1970, 1371.

$M^2 = -CH=N-$ (Dc)

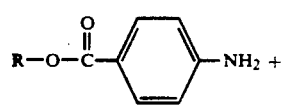

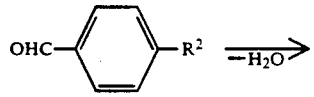

-continued
$M^2 = -CH=N-$

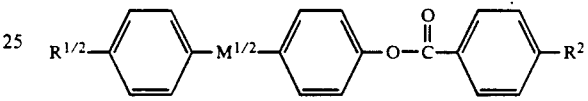

R has the same meaning as in (Da). The further synthesis route corresponds to that of compound (Da).

The reactive derivatives of the aromatic dicarboxylic acids (E) and aromatic carboxylic acids (F) are known from the literature and are prepared by known reactions. Reactive carboxylic acid derivatives (F) containing protective groups, for example 4-carbobenzoxybenzoic acid derivatives, are prepared in accordance with W. R. Krigbaum, Eur. Polym. J. 20, 225 (1984).

The production of the liquid crystalline compounds according to the invention from the basic structural elements (A), (B), (C), (D), (E), and (F) and other auxiliaries is outlined briefly in the following.

3-Nuclear compounds (m=0, n=1, o=1, p=0):

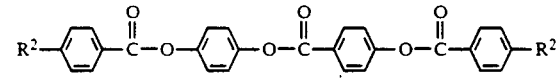

are prepared from phenols of type (A) or (B) by esterification with reactive aromatic carboxylic acids.

4-Nuclear compound: is obtained by esterification of the ester biphenol with 2 mol of a reactive aromatic carboyxlic acid derivative:

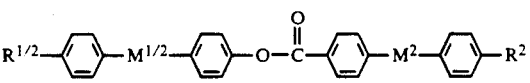

(m=o, n=1, o=1, p=o)

or from the phenols (A) or (B) by esterification with the reactive carboxylic acid derivative (D)

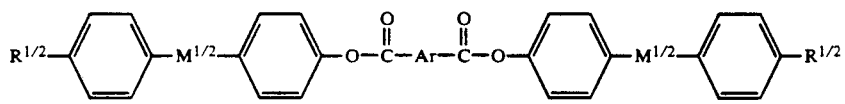

(m=o, n=1, o=1, p=1)

5-nuclear compounds (m=1, n=1, o=1, p=1) are obtained by esterification of the phenols (A) and (B) with reactive aromatic dicarboxylic acids:

(Db)

6-nuclear compounds (m=0, n=1, o=1, p=1). are obtained from 4-nuclear compounds of the following type:

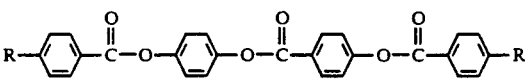

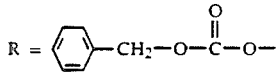

by the synthesis sequence 1. hydrogenation (elimination of the protective group with release of the bisphenol) and 2. esterification of the two phenolic OH groups with n aromatic carboxylic acid derivative (F)

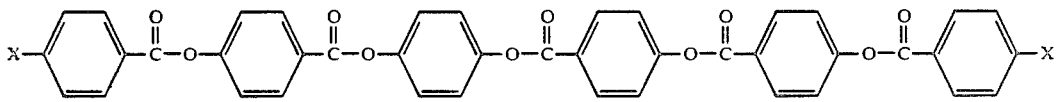

7-nuclear compounds (m=n=o=p=1):
may be obtained from 3-nuclear compounds, in which $R^{1,2}=X$,

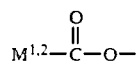

and the ring substituent $R^2$ is a protective group of the type

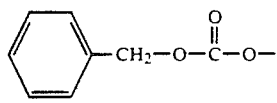

by the following synthesis sequence;
1) removal of the protective group by hydrogenation (release of the phenolic OH function)
2) reaction with a reactive aromatic dicarboxylic acid derivative

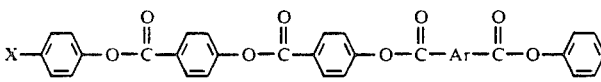

7-Nuclear compounds may be obtained from 5- nuclear compounds, in which $R^{1/2}$ represents the protective group

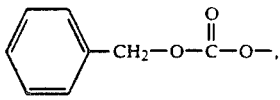

by the same synthesis sequence:

1) removal of the protective group by hydrogenation and
2) reaction of the phenolic OH group with a reactive aromatic carboxylic acid derivative (VII):

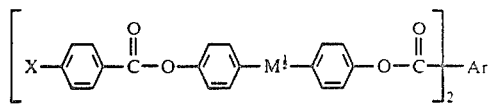

8-nuclear compounds (m=0, n=2, o=1, p=1) are obtained from 4-nuclear compounds of the type

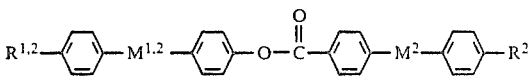

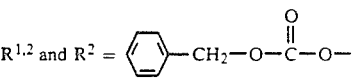

by the following synthesis sequence:
1) removal of the protective group by hydrogenation
2) reaction of the phenolic OH group with reactive carboxylic acid derivatives corresponding to formula (D)

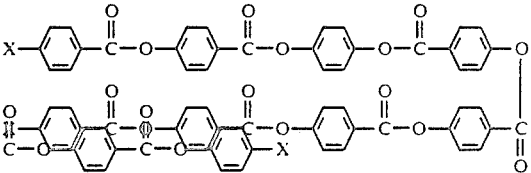

9-nuclear compounds (m=1, n=1, o=2, p=1) are obtained by consequent utilization of the protective group technique via the following synthesis sequence. Esterification of phenols of type (A) or (B), in which $R^1$ or $R^2$ is a protective group:

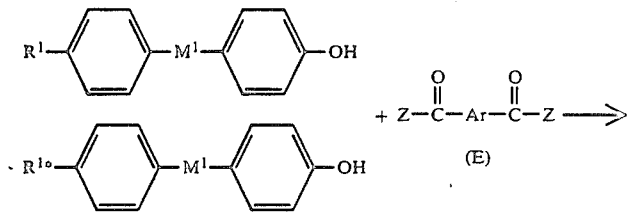

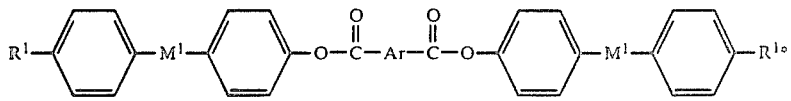

After elimination of the protective group y hydrogenation, bisphenol is esterified together with a 3-nuclear phenol

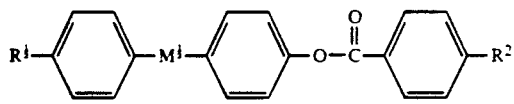

(prepared by removal of the protective group $R^1$:

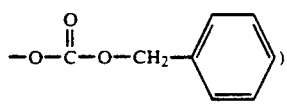

and another reactive aromatic dicarboxylic acid derivative (VI) to form the corresponding 9-nuclear compound:

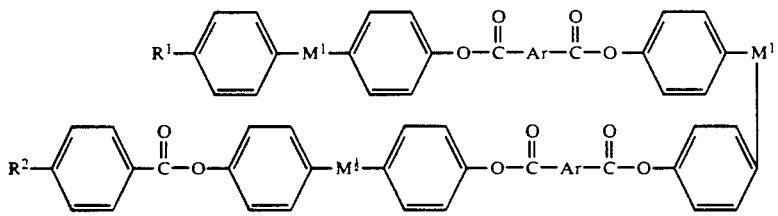

Correspondingly higher-nuclear compounds containing more than 9 aromatic ring systems may be analogously synthesized.

The low molecular weight, liquid crystalline additives (I) which may be used in accordance with the invention are described in Applicants' own hitherto unpublished patent application P 38 24 365.2 and may be prepared by the methods described therein. A characteristic method for their production is described in the Examples.

The low molecular weight, liquid crystalline additives corresponding to formula (I) are preferably used in quantities of 0.3 to 8% by weight and more preferably in quantities of 0.5 to 5% by weight either individually or in admixture.

COMPOUNDS CORRESPONDING TO FORMULA (II)

Preferred radical $R^3$ of formula (II) are alkyl radicals containing from 1 to 30 and more preferably from 1 to 22 carbon atoms, such as $CH_3$, $C_2H_5$, $C_3H_7$, $C_4H_9$, $C_5H_{11}$, $C_6H_{13}$, Chd $15H_{31}$, $C_{16}H_{33}$, $C_{17}H_{35}$, $C_{18}H_{37}$, $C_{19}H_{39}$ and $C_{22}H_{45}$, most preferably $CH_3$, or aromatic radicals corresponding to formulae (III), (IIIa) and (IV)

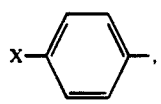 (III)

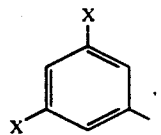 (IV)

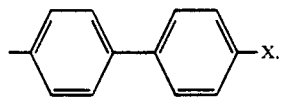 (IIIa)

in which
X may be hydrogen, halogen, $NO_2$, $C_{1-4}$ alkyl, $C_{3-6}$-cycloalkyl, $C_{6-14}$ aryl, $O-C_{1-4}$ alkyl, $O-C_{3-6}$ cycloalkyl, fluorinated $C_{1-4}$ alkyl, fluorinated $C_{3-6}$ cycloalkyl or fluorinated $C_{6-14}$ aryl.

Particularly preferred radicals $R^3$ are aromatic radicals corresponding to formulae (V) and (VI)

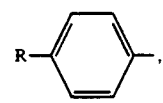 (V)

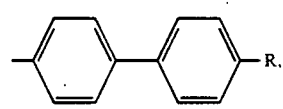 (VI)

in which
R is hydrogen, halogen, such as fluorine, chlorine, $C_{1-4}$ alkyl, $C_{3-6}$ cylcoalkyl, $O-C_{1-4}$ alkyl, $O-C_{3-6}$ cycloalkyl, fluorinated $C_{1-4}$ alkyl or fluorinated $C_{3-6}$ cycloalkyl. Aromatic radicals of formulae (V) and (VI), in which
R is hydrogen, are especially preferred.

Preferred monocarboxylic acids, from which the radical

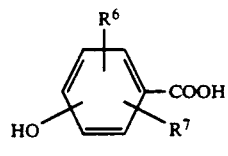 (VII)

and

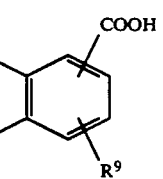 (VIII)

is derived, are inter alia benzoic acid, 4-methyl benzoic acid, 4-methoxy benzoic acid and 4-biphenyl carboyxlic acid. Particularly preferred monocarboxyic acids are inter alia benzoic acid, 4-methyl benzoic acid and biphenyl carboxylic acid.

Suitable difunctional aromatic radicals (Ar*) in formula (II) are those based on aromatic hydroxycarboxylic acids corresponding to the following formulae

in which
- $R^6$ to $R^9$ represent $C_{1-4}$ alkyl (preferably methyl, ethyl),
- $C_{1-4}$ alkoxy (preferably methoxy, ethoxy), $C_{6-10}$ aryl or aryloxy (preferably phenyl, phenyloxy, naphthyl, naphthyloxy, biphenyl, biphenyloxy, tolyl, tolyloxy), $C_{7-12}$ alkylaryl (preferably benzyl), halogen (preferably chlorine or bromine) or hydrogen and the valencies between nucleus and hydroxyl group and between nucleus and carboxyl groups each form an angle of 45 to 180°.

Preferred aromatic hydroxy carboxylic acids are 4-hydroxy-3-methyl benzoic acid, 4-hydroxy-3-methoxy benzoic acid, 4-hydroxybenzoic acid, 3-hydroxybenzoic acid, 6-hydroxy-2-naphthoic acid. 4-Hydroxybenzoic acid, 3-hydroxy benzoic acid and 6-hydroxy-2-naphthoic acid are particularly preferred.

The aromatic hydroxy carboxylic acids have the OH group preferably symmetrical (1,4-phenylene or 2,6-naphthylene or 4,4-diphenyl positions) to the carboxyl group.

Suitable difunctional aromatic radicals ($Ar^b$) corresponding to formula (II) are those based on diphenols corresponding to formula (IX)

$$HO-Z-OH \qquad (IX)$$

in which
- Z is a difunctional, mononuclear or polynuclear aromatic radical containing 6 to 30 carbon atoms, the structure of Z being such that the two OH groups are each directly attached to a carbon atom of an aromatic ring system and the two valencies form an angle of 45 to 180°.

The aromatic radicals may be substituted by 1 to 4 $C_{1-4}$ alkyl, $C_{1-4}$ alkoxy, phenyl, phenoxy, benzyl groups or halogen atoms (preferably chlorine and bromine) and, in addition to m-/p-phenylene, 2,6- and/or 1,5-naphthylene and 4,4'-biphenylene radicals, also include phenylene radicals connected by oxygen, sulfur, carbonyl, sulfonyl or azomethine, $C_{1-18}$ and preferably $C_{1-4}$ alkylene or alkylidene, (alkyl-substituted) cyclohexylene or hexylidene or $-O(CH_2)_nO-$ with n=2 to 4.

Preferred diphenols are, for example, hydroquinone, 4,4'-dihydroxydiphenyl, 4,4'-dihydroxydiphenyl ether, 4,4'-dihydroxydiphenyl ethane, 4,4'-dihydroxydiphenoxy ethane, 3,5'-dihydroxydiphenyl, 3,5'-dihydroxydiphenyl ether, 1,5-dihydroxynaphthalene, 2,6-dihydroxynaphthalene, 1,4-dihydroxynaphthalene, methyl hydroquinone, phenyl hydroquinone, 2,2'-dimethyl-4,4'-dihydroxydiphenyl, 3,3',5,5'-tetramethyl-4,4'-dihydroxydipheny, 1,2-(2-chloro-4-hydroxyphenoxy)-ethane, 4-methoxy-2,6-dihydroxy naphthalene, resorcinol, 3,4'-dihydroxydiphenyl, 1,6-dihydroxy naphthalene, 1,7-dihydroxy naphthalene, 2,7-dihydroxy naphthalene, 4-chlororesorcinol, 4-phenyl resorcinol, 4-ethoxy resorcinol, 2,5-dichloro-1,6-dihydroxy naphthalene and 4-methoxy-2,7-dihydroxy naphthalene.

Particularly preferred diphenols are hydroquinone and 4,4'-dihydroxydiphenyl.

Suitable difunctional radicals ($R^4$) corresponding to formula (II) are those based on dicarboxylic acids corresponding to formula (X)

$$HOOC-R^4-COOH \qquad (X)$$

in which
- $R^4$ represents $C_mH_{2m}$ with m=0-40, preferably 0-20 and 30-38 or even a cycloaliphatic radical containing 5 to 15 carbon atoms or, preferably, a difunctional aromatic radical containing 6 to 24 carbon atoms and preferably 6 to 16 carbon atoms, the two valencies forming an angle of 45 to 180°. The difunctional aromatic radicals may be substituted by 1 to 4 $C_{1-4}$ alkyl, $C_{1-4}$ alkoxy, phenyl, phenoxy, benzyl groups or halogen atoms (preferably chlorine and bromine) and, in addition to 1,4-phenylene groups, 1,5- or 2,6-naphthylene groups and 4,4'- or 3,5'-biphenylene groups, also include phenylene groups connected by oxygen, sulfur, carbonyl, sulfonyl, $C_{1-4}$ alkylene or alkylidene, cyclohexylene or hexylidene or $-O(CH_2)_nO-$ with n=1 to 4, preferably in symmetrical substitution ("paraposition").

The following (cyclo)aliphatic dicarboxylic acids are preferred: oxalic acid, succinic acid, adipic acid, suberic acid, azelaic acid, trimethyl adipic acid, sebacic acid, dodecanedioic acid, dimeric fatty acids and 1,4-cyclohexane dicarboxylic acid.

Oxalic acid, adipic acid, sebacic acid and dimeric fatty acids are particularly preferred.

Preferred aromatic dicarboxylic acids are those based on the following difunctional groups: 1,4-phenylene, 1,4-naphthylene or 4,4'-biphenylene, in which the two bonds extend coaxially in opposite directions, or 1,5-naphthylene groups, 2,6-naphthylene groups or 3,5'-biphenylene groups, in which the two bonds extending in opposite directions are displaced parallel to one another, and 1,3-phenylene groups, 1,3-, 1,6-, 1,7- or 2,7-naphthylene groups or 3,4'-biphenylene groups in which the two bonds are not situated at adjacent atoms and do not extend in opposite directions either coaxially or displaced parallel to one another.

Preferred aromatic dicarboxylic acids are 1,4-naphthalene dicarboxylic acid, 1,5-naphthalene dicarboxylic acid, 2,6-naphthalene dicarboxylic acid, biphenyl-4,4'-dicarboxylic acid, biphenyl-3,3'-dicarboxylic acid, diphenoxyethane-4,4'-dicarboxylic acid, diphenyl ether-4,4'-dicarboxylic acid, methyl terephthalic acid, methoxyterephthalic acid, chloroterephthalic acid, 4-chloronapthhalene-2,7-dicarboxylic acid, 2,6- or 2,7-naphthalene dicarboxylic acid, biphenyl-3,4'-dicarboxylic acid, 4-methyl isophthalic acid, 5-methyl isophthalic acid, diphenylether4,4'-dichloro-3,3'-dicarboxylic acid, isophthalic and terephthalic acid.

Isophthalic and terephthalic acid are particularly preferred.

It is possible to use aliphatic or aromatic dicarboxylic acids both alone and in the form of mixtures.

Suitable difunctional groups ($R^5$) of formula (II) are those based on amino compounds corresponding to formula (XI)

$$H_2N-R^5-Y \qquad (XI)$$

in which $R^5$ represents $C_mH_{2m}$ with m=3 to 40, preferably 4 to 12, and a cycloaliphatic radical containing 5 to 15 carbon atoms (5 to 6 ring carbon atoms) and Y represents OH, COOH or $NH_2$, or in which $R^5$ is a difunctional aromatic radical containing 6 to 24 carbon atoms and preferably 6 to 16 carbon atoms, the two valencies forming an angle of 45 to 180°. The difunctional aromatic radicals may be substituted by 1 to 4 $C_{1-4}$ alkyl, $C_{1-4}$ alkoxy, phenyl, phenoxy, -benzyl groups or halogen atoms (preferably chlorine and bromine) and, in addition to phenylene, naphthylene and biphenylene radicals, also include phenylene groups connected by oxygen, sulfur, carbonyl, sulfonyl, $C_{1-4}$ alkylene or alkylidene, cyclohexylene or hexylidene or $-O(CH_2)_nO-$ with n=1 to 4.

Instead of the aliphatic aminocarboxylic acids, the corresponding lactams may also be used, for example caprolactam instead of ε-aminocaproic acid.

Preferred (cyclo)aliphatic aminocarboxylic acids are ε-aminocaproic acid or caprolactam, ω-aminoundecanoic acid, ∂-aminododecanoic acid or lauric lactam, 4-aminocyclohexyl carboxylic acid; preferred aromatic amino carboxylic acids are 4-aminobenzoic acid or 6-amino-2-naphthoic acid.

ε-Aminocaproic acid or caprolactam, 4-aminobenzoic acid and 6-amino-2-naphthoic acid are particularly preferred.

Preferred amino phenols are, for example, 3-aminophenol, 4-aminophenol, 3-amino-2-methyl phenol, 3-amino-4-methyl phenol, 5-amino-1-naphthol, 6-amino-1-naphthol, 5-amino-2-naphthol, 7-amino-2-naphthol, 8-amino-2-naphthol, 6-amino-2-naphthol and 4'-amino-1-hydroxybiphenyl; 4-aminophenol, 3-aminophenol and 4'-amino-1-hydroxybiphenyl are particularly preferred.

Preferred oligomers corresponding to formula (II) are those which contain on average 3 to 25, preferably 4 to 20 and more preferably 4 to 15 aromatic partial structures, an aromatic partial structure being as defined under formula (I).

The compounds of formula (II) mentioned above are prepared by known melt and transesterification processes which are also used for the production of thermotropic LC polymers (direct esterification process [EP-A 0 088 546], acetate process [EP-A 0 102 719, 134 204], melt transesterification of carboxylic acid phenyl esters with diphenols (diphenyl ester process) [EP-A 072 540, 070 539, 024 499, 45 499, DE-OS 20 25 971, EP 070 539 and EP 132 637]).

The compounds of formula (II) according to the invention are prepared in particular by the acetate process and/or the diphenyl ester process. They are oligomeric mixtures with average molecular weights ($\overline{M}n$) of ≦4000, preferably ≦2500, which may have both the above-mentioned structural units and also their molecular weight in statistical distribution and show liquid-crystalline properties. They are used as LC additives 2) in the quantities indicated for the production of the new polyamide molding compounds and blends, the liquid-crystalline oligomeric compounds of formula (II) free from aliphatic units being preferred, particularly with statistical distribution of the components in (II).

The low molecular weight, liquid-crystalline additives (II) are used in quantities of 0.1 to 15% by weight, preferably in quantities of 0.3 to 8% by weight and more preferably in quantities of 0.5 to 5% by weight in the production of the polyamide molding compounds and blends according to the invention. They may be used individually or in admixture.

Preferred LC additives 2) are the statistical compounds corresponding to formula (II).

The present invention also relates to the new, liquid-crystalline oligomeric esters and/or ester amides corresponding to formula (II), in which the symbols are as already defined.

The present invention also relates to the use of the polyamide molding compounds and blends according to the invention for the production of moldings, films, fibers and other articles and also to the moldings, films, fibers and other articles produced from the new polyamide molding compounds and blends.

POLYAMIDES

Polyamides 1) suitable for use in accordance with the invention include partially crystalline and amorphous polyamides. They may be used individually or in admixture. Examples of polyamides in the context of the invention are PA 6, 11, 12, 46, 66, 67, 68, 69, 610, 1012, 612, 1010, 1212, 6/66 copolyamides, 6/12 copolyamides, 6/11 copolyamides, 66/11 copolyamides, 66/12 copolyamides, 6/610 copolyamides, 66/610 copolyamides, 6/66/610 terpolyamides, 616 copolyamides, 6T6 copolyamides, 6IT copolyamides, PA 6I, copolyamides of 1,4-cyclohexane dicarboxylic acid, 2,2,4- and 2,4,4-trimethyl hexamethylene diamine, copolyamides of terephthalic acid, 2,2,4- and 2,4,4-trimethyl hexamethylene diamine, copolyamides of isophthalic acid, lauric lactam and 3,5'-dimethyl-4,4'-diaminodicyclohexyl methane, copolyamides of isophthalic acid, azelaic acid and/or sebacic acid and 4,4'-diaminodicyclohexyl methane (or isomer mixtures), polyamides of caprolactam, isophthalic acid (+optionally terephthalic acid) and 4,4'-diaminodicyclohexyl methane (or isomer mixtures), copolyamides of caprolactam, isophthalic acid (+optionally terephthalic acid) and isophorone diamine, copolyamides of isophthalic acid (+optionally terephthalic acid) and/or other aromatic or aliphatic dicarboxylic acids, hexamethylene diamine and/or optionally alkyl-substituted hexamethylene diamineses and 4,4'-diaminodicyclohexylalkanes,alkyl- substituted adjacent to the amino groups and also other copolyamides or mixtures of different polyamides of components of the type normally used for polyamides. Polyamide block polymers, such as polyether and polyetherester amides, may also be used.

Polyamides obtainable from dicarboxylic acids and diisocyanates are also suitable (for example copolyamides of adipic acid, azelaic acid and 4,4'-diphenylmethane diisocyanate and copolyamides of terephthalic acid, azelaic acid, 4,4'-diphenylmethane diisocyanate and 2,4-(2,6)-tolylene diisocyanate).

Preferred polyamides, which may be used individually or in admixture, are pA 6, 46, 66, 610, 1012, 11, 12, 1212, 616, 6I, 6T6, 6/66 copolyamides, copolyamides of caprolactam, isophthalic acid and isophorone diamine, copolyamides of isophthalic acid (+optionally terephthalic acid), azelaic acid and 4,4'-diaminodicyclohexyl methane (or isomer mixtures) and copolyamides of isophthalic acid (+ optionally terephthalic acid), caprolactam and 4,4'-diaminodicyclohexyl methane (or isomer mixtures).

Polyamide 6 and 66 are particularly preferred.

Blending components for the polyamide blends

Suitable polymeric blending components (one of the possible additives according to 3)) for the production of the new free-flowing polyamide blends which, in addition to the polyamides, always contain at least one polymeric blending component include, for example, diene rubbers, acrylate rubbers, polyethylenes, polypropylenes, ethylene/ propylene copolymers, ethylene/1-butene copolymers, ethylene/propylene/diene terpolymers, ethylene and/or propylene/acrylic acid/acrylate copolymers, ethylene/vinyl acetate copolymers, polyoctenylenes, polystyrenes, (α-methyl)styrene/(meth)acrylonitrile copolymers, (meth)acrylonitrile/butadienes/(α-methyl) styrene polymers (ABS), high-impact polystyrenes, polycarbonates, aromatic polyester (carbonates), polyesters such as, for example, polyethylene terephthalate, polysulfones, polyphenylene oxides, polyether ketones, polyether ether ketones, polyamide imides, polyether sulfones, polyether imides, polyester imides and polyimides of the type known from the prior art as blending components or modifiers. These blending components may be used individually or in admixture with one another.

The polymeric blending components should be—optionally at least partly—chemically modified in such a way that the two phases are partly coupled, for example through carboxylic acid groups. This may be done, for example, by using a copolymer of ethylene and/or propylene and small quantities of acrylic acid or an ethylene/ propylene/diene polymer grafted with small quantities of maleic anhydride or a polyphenylene oxide grafted with small quantities of maleic anhydride either individually or in admixture with unmodified blending components. The two phases may also be coupled through ester or epoxide groups. They may also be coupled, for example, through the presence of suitable low molecular weight or polymeric compatibility promoters; for example, an acrylonitrile/styrene/acrylic acid terpolymer may be used as compatibility promoter in blends with ABS. The blending components may also contain reactive terminal groups which are capable of reacting with the polyamide, for example amino- or carboxyl-terminated polydiene rubbers.

The rubbers may also be grafted in a core/shell structure.

According to the invention, it is also possible to obtain mixtures of polyamides with more than one polymer or blending component, for example blends of polyamide 66, polyphenylene oxide and high-impact polystyrene or blends of polyamide 66, aromatic polyesters and an impact modifier. In mixtures such as these, the polyamide content should be no less than 30% by weight and preferably no less than 50% by weight, based on the final mixture.

The polymeric blending components may also be mixed in a previous step (premixed) with polyamides or mixtures of polyamides to form polyamide blends or are preferably used as one of the additives according to 3). In this case, at least one polyamide, at least one polymeric blending component, at least one LC additive 2) corresponding to formula (I) and/or (II) and, optionally, other standard additives 3), such as glass fibers or even stabilizers, are mixed in the melt (preferably in extruders).

The polymeric blending components are generally used in quantities of at least 5% by weight, based on the final mixture.

In the case of polyamide blends, therefore, at least one additive 3), namely the polymeric blending component, is always present in the final polyamide blend in addition to polyamides 1) and the LC flow promoters 2).

The present invention also relates to the use of the liquid-crystalline, low molecular weight esters and/or ester amides (I) and/or the oligomeric esters and/or ester amides (II) as LC flow promoters 2) in quantities of 0.1 to 15% by weight (or in the preferred quantities mentioned above) in the production of polyamide molding compounds and/or polyamide blends. The present invention also relates to a process for the production of the new freeflowing molding compounds and blends by mixing of at least one polyamide 1), at least one LC flow promoter (I) and/or (II) 2) and optionally the additives 3) in the melt; the additives 3) may even have been introduced into the polyamide 1) beforehand in a separate step, so that a correspondingly modified polyamide 1) is used. The new polyamide molding compounds and blends are preferably produced in extruders or kneaders.

The addition of liquid-crystalline polymers to thermoplastics is known (cf. for example EP-OS 0 030 417). In general, however, the limited compatibility of the thermoplastics with the liquid-crystalline polymers is a disadvantage.

Infusible, whisker-like poly-(p-hydroxybenzoate) crystals are described as a reinforcing component in U.S. Pat. No. 4,673,724. On account of their very high melting or softening points, however, these crystals are very difficult to produce and are particularly incompatible with other polymers.

Mixtures of liquid-crystalline polymers and amorphous thermoplastics produced in situ are also known (cf. for example G. Kiss, Polymer Engineering & Science, 27, pages 410–423 (1987)). However, mixtures such as these have the disadvantage that the reinforcing effects obtainable depend to a large extent on the mixing conditions and reproducible processing conditions are often difficult to establish.

In addition, in the production of composites of the type in question, the mixing components have very different melt viscosities under processing conditions, so that only a limited number of suitable polymers is available for the production of such composites.

Chemically reactive, liquid-crystalline aromatic esters which condense into the polymer chain by transesterification at relatively high temperatures are described in U.S. Pat. No. 4,650,836 as processing aids for conventional thermoplastics, such as aromatic polyesters, or for liquid-crystalline polymers which are very difficult to process by the methods normally used for thermoplastics. However, the thermoplastics are chemically changed as a result of the incorporation of the aromatic liquidcrystalline esters in the polymer chain. The disadvantage of this is that different incorporation ratios and, hence, non-reproducible properties are obtained in dependence upon the processing conditions.

The free-flowing molding compounds and blends according to the invention may be produced by any of the methods normally used for mixing in the processing of thermoplastics, preferably under such conditions (residence times/temperatures) that only little, if any, transesterification takes place and the liquidcrystalline additives are substantially unreacted.

To produce the free-flowing polyamide molding compounds and/or polyamide blends according to the invention containing LC flow promoters 2), the polyamide component(s) 1), the LC flow promoters (I) and-/or (II) 2) and the additives 3) optionally used (for example blending components, reinforcing materials, stabilizers, etc.) may be mixed together in the melt. The polyamide molding compounds and blends according to the invention are preferably produced by mixing all the starting components in standard screw extruders. The liquid-crystalline LC flow promoter 2) may be introduced into the extruder with the polyamide component 1) at the outset or may be added to the melts to be extruded at a later stage during the extrusion process.

The LC flow promoters (I) and/or (II) 2) may therefore be introduced at any time during the production of the molding compounds and blends according to the invention. They may also be added immediately before the polyamide molding compounds and blends are processed. The LC additives 2) may be added as such or even in the form of concentrates in a (preferably as high or lower-melting) polymer.

The polyamides 1) may contain the additives 3) already incorporated. However, the additives 3) are preferably mixed together with the liquid-crystalline components 2) and the polyamides 1) in a single operation.

The free-flowing PA molding compounds and blends modified with LC flow promoters 2) in accordance with the invention may contain other standard additives 3) in quantities of from 0.001 to 150% by weight and preferably in quantities of 0.01 to 100% by weight, based on the total weights of 1) and 2). Other standard additives suitable for use in accordance with the invention are reinforcing materials (glass fibers, aramide fibers, carbon fibers, glass beads, $SiO_2$, chalk, talcum, kaolin, mica, etc.), plasticizers, antioxidants, pigments, dyes, weathering stabilizers (or stabilizer combinations), lubricants, flow aids, mold release agents, nucleating agents, additives which reduce the uptake of water (for example monophenols, bisphenols, (alkyl)phenol-formaldehyde condensates etc.), flameproofing agents and other well-known additives of the type which have been proposed for corresponding polyamide materials. The additives 3) independently of one another may be used individually or in the form of a concentrate. However, they may also be completely or partly present in the polyamides 1).

The polyamide molding compounds and blends according to the invention may be processed, for example, by injection molding and extrusion to form moldings and other articles. -By virtue of their drastically improved flowability, they are particularly suitable for complicated moldings of large surface area which otherwise would have to be produced with more equipment for processing, often with surface faults, or which in many cases could not even be produced at all.

They are particularly suitable for use in the automotive field.

Even where small quantities of LC additives 2) are used, the PA molding compounds and blends according to the invention are distinguished by a drastically increased flowability and, in some cases, also by improved mechanical properties and heat resistance values. They may also be distinguished by reduced water uptake and by a higher crystallization rate and degree of crystallization. Accordingly, they represent a valuable addition to the state of the art.

The following Examples are intended to illustrate the invention without limiting it in any way, $\eta_{rel}$-values have been measured at 25° C. in m-Cresol (1% solution).

EXAMPLES

EXAMPLE 1

(Comparison; starting material); example for 4-nuclear compounds corresponding to formula I. Production example of a low molecular weight, liquidcrystalline ester suitable for use in accordance with the invention corresponding to F 3 824 365.2 1st stage: 4-hydroxyphenyl-4-hydroxybenzoate 138.1 g p-hydroxybenzoic acid and 110.1 g hydroquinone are suspended with 2 g boric acid and 2.5 g sulfuric acid in 900 ml xylene and the resulting suspension is heated under reflux until the elimination of water is complete. The product is filtered off under suction, dried and washed with dilute Na bicarbonate solution, redried and dissolved in 500 ml acetone. The solution is filtered off hot from undissolved constituents and the product is precipitated from water, filtered under suction and dried. Yield: 182 g, Mp.: 245-247° C. 2nd stage: 4-(4-methylbenzoyloxy)-benzoic acid-4-(4-methylbenzoyloxy)-phenyl ester 345.3 g 4-hydroxyphenyl-4-hydroxybenzoate are suspended with 249 g pyridine in 3000 ml methylene chloride and 460 g 4-methyl benzoic acid chloride are added to the resulting suspension over a period of 3 hours at 0° C. The reaction mixture is stirred for 14 h at room temperature. The solvent is distilled off in vacuo and the residue is stirred with 1.4 l 5% hydrochloric acid. The insoluble product was filtered off under suction, washed with water until neutral and dried. Yield 643 g (85% of the theoretical).

Under a polarization microscope, a liquid-crystalline phase can be detected at 190 to 350° C.

EXAMPLES 2-4

(Use according to the invention)

Polyamide 6 granulate ($\eta_{rel}$=2.9) was mixed with 5, 10 and 15% by weight 4-(4-methylbenzoyloxy)-benzoic acid-4-(4-methylbenzoyloxy)-phenyl ester (LC ester number 6 of type (I) according to Example 1) and the resulting mixtures extruded in a single-screw extruder at 270° C.

The strand issuing from the extruder was cooled in a water bath, granulated and dried. The melt viscosities and $\eta_{rel}$ values of the polyamides are shown in Table 1.

EXAMPLES 5-7

As in the preceding Examples, corresponding PA 6 granulate was mixed with 5, 10 and 15% by weight 4-(4-methoxybenzoyloxy)-benzoic acid-4-(4-methoxybenzoyloxy)-phenyl ester (LC ester no. 7 of type (I)) and the resulting mixtures extruded.

The melt viscosities of the polyamides are shown in Table 1.

EXAMPLES 8-11

PA 6 granulate ($\eta_{rel}$=2.9) was dry-mixed with 1% by weight and 2% by weight 4-(4-methylbenzoyloxy)-benzoic acid-4-(4-methylbenzoyloxy)-phenyl ester (LC ester no. 6), 4-(4-methoxybenzoyloxy)-benzoic acid-4-(4-methoxybenzoyloxy)-phenyl ester (LC ester number 7) and 4-benzoyloxy benzoic acid-4-(4-benzoyloxy)-phenyl ester (LC ester no. 5) and the resulting mixtures extruded at 270° C. in a ZSK 53 twin-screw extruder at a throughput of 24 kg h$^{-1}$. The issuing strands were cooled in a water bath, granulated and dried.

The melt viscosities and energy absorption values of the extruder are shown in Table 1.

COMPARISON EXAMPLE 1

The PA 6 granulate was extruded in the same way as in Examples 8 to 11 in the absence of the low molecular weight, liquid-crystalline additives. The energy absorption of the extruder is shown in Table 1.

TABLE 1

| Example | Quantity % by weight | LC ester additive | MV*) (Pa · s) | E**) (A) | $\eta_{rel}$ |
|---|---|---|---|---|---|
| 2 | 5% | No. 6 | 15 | — | 2.7 |
| 3 | 10% | No. 6 | 4 | — | 2.7 |
| 4 | 15% | No. 6 | 2.5 | — | 2.6 |
| 5 | 5% | No. 7 | 8 | — | |
| 6 | 10% | No. 7 | 3.6 | — | |
| 7 | 15% | No. 7 | 2.2 | — | |
| 8 | 1% | No. 6 | 85 | 20 | 2.8 |
| 9 | 2% | No. 6 | — | 16 | 2.7 |
| 10 | 1% | No. 7 | — | 19 | 2.7 |
| 11 | 1% | No. 5 | 85 | 20 | 2.7 |
| Comp. 1 | — | | — | 26 | 2.9 |
| Starting granulate | — | | 165 | — | 2.9 |

*)Melt viscosity at 270° C./100 s$^{-1}$
**)Energy absorption of extruder in amperes, it is a measure of flowability

EXAMPLES 12 AND 13

PA 6I (an amorphous polyamide of isophthalic acid and hexamethylene diamine) was mixed with quantities of 1% by weight and 5% by weight 4-methoxybenzoyloxy-4-(4-methylbenzoyloxy)-benzene (LC ester number 1) and the resulting mixtures extruded at 270° C. in the same way as in Examples 1 to 3. The melt viscosities, $\eta_{rel}$ values and thermal properties are shown in Table 2.

TABLE 2

| Example | Quantity (% by weight) | $\eta_{rel}$ | MV*) |
|---|---|---|---|
| 12 | 1 | 2.8 | 2700 |
| 13 | 5 | 2.7 | 1600 |
| Starting granulate | — | 3.0 | 4500 |

*)MV = melt viscosity at 270° C. and at a shear rate of 1 s$^{-1}$ in Pa · s.

EXAMPLE 14

(according to the invention; type II)

Example of preparation by melt transesterification.

138 g p-hydroxybenzoic acid, 110 g hydroquinone and 242 g benzoic acid are heated in the presence of 0.4 g lead acetate and 312 g acetanhydride from a temperature of 140° C. to the point at which acetic acid begins to be evolved. As the distillation rate diminishes, the temperature is increased in stages to 300° C. until the elimination of acetic acid is complete. The reaction product is precipitated in xylene, filtered under suction, washed with cold xylene and petroleum ether and dried. Yield: 90–95%.

Under a polarization microscope, the statistical compound of type II shows a liquid-crystalline phase in the range from 190 to 350° C.

EXAMPLES 15–17

A 30% glass-fiber-reinforced PA 6 granulate was mixed with quantities of 1 and 3% by weight of the LC ester of type II produced in accordance with Example 14 in the same way as in Examples 8–11 and the resulting mixtures extruded at 260° C. A corresponding material without the LC additive was similarly extruded. The values for the energy absorption of the extruder are shown in Table 3.

EXAMPLES 18–20

A 30% glass-fiber-reinforced PA 66 granulate was mixed with quantities of 1 and 3% by weight of the ester of type II produced in accordance with Example 14 in the same way as in Examples 8–11 and the resulting mixtures extruded at 280° C.; a corresponding material without the LC additive was similarly extruded. The energy absorption values of the extruder are shown in Table 3.

EXAMPLES 21 AND 22

An amorphous copolyamide of isophthalic acid (21.5 parts by weight), 4,4'-diaminodicylohexyl methane (54.3 parts by weight) and azelaic acid (24.3 parts by weight) was mixed with 1% by weight of the ester produced in accordance with Example 14 in the same way as in Examples 8 to 11 and the resulting mixture extruded at 280° C.; a corresponding material without the LC additive was similarly extruded. The energy absorption values of the extruder are shown in Table 3.

TABLE 3

| Example | Quantity of additive (% by weight) | E (amperes) |
|---|---|---|
| 15 | 1 | 28 |
| 16 | 3 | 24 |
| 17 | 0 | 40 |
| 18 | 1 | 28 |
| 19 | 3 | 22 |
| 20 | 0 | 40 |
| 21 | 1 | 44 |
| 22 | 0 | 70–90 |

The Examples show that, even in very small quantities, the low molecular weight, liquid-crystalline additives to be used in accordance with the invention drastically increase the flowability of PA molding compounds.

EXAMPLES 23 AND 24

A polyamide blend of 70% by weight PA 6, relative viscosity 2.9, and 30% by weight of an elastomer (graft polymer of 80% graft base of crosslinked polybutadiene, gel content >70%, as measured in toluene, and 20% graft shell of methyl methacrylate) was dry-mixed with quantities of 1 and 3% by weight of the statistical ester produced in accordance with Example 14) and the resulting mixture extruded at 260° C. in a ZSK 53 twin-screw extruder at a throughput of 24 kg h$^{-1}$. The issuing strands were cooled in a water bath, granulated and dried. The energy absorption values of the extruder are shown in Table 4.

COMPARISON EXAMPLE 2

In the same way as described for Examples 23 and 24, the same blend was extruded in the absence of the additives to be used in accordance with the invention. The energy absorption of the extruder is shown in Table 4.

EXAMPLES 25 AND 26

A polymer blend based on a partially crystalline polyamide and a polyphenylene oxide (Noryl®GTX 620, General Electric Company) was dry-mixed with quantities of 1 and 3% 4-benzoyloxy benzoic acid-4-(4-benzoyloxy)-phenyl ester (LC ester no. 5 of type (I) prepared from 4-hydroxyphenyl-4-hydroxybenzoate and benzoic acid chloride in methylene chloride/pyridine, liquid-crystalline range 190–290° C. under a polarization microscope) and the resulting mixture extruded in a single-screw extruder at a temperature of 280° C. The issuing strand was cooled in a water bath, granulated and dried. The melt viscosity values are shown in Table 4.

COMPARISON EXAMPLE 3

In the same way s described for Examples 25 and 26, the same blend was extruded in the absence of the additives to be used in accordance with the invention. The melt viscosity is shown in Table 4.

TABLE 4

| Example | Additive (% by weight) | E* (A) | MV** (in [Pa · s]) at 1 s$^{-1}$ | at 10 s$^{-1}$ |
|---|---|---|---|---|
| 23 | 1% 5 | 26 (at 260° C.) | — | — |
| 24 | 3% 5 | 22 (at 260° C.) | — | — |
| Comp. 2 | — | 35 (at 260° C.) | — | — |
| 25 | 1% 5 | not determined | 2100 | 520 |
| 26 | 3% 5 | not determined | 590 | 140 |
| Comp. 3 | — | not determined | 5500 | 2300 |
| 27 | 1% 5 | 46 (at 290° C.) | | |
| Comp. 4 | — | 58 (at 290° C.) | | |

*E is the energy absorption of the extruder during processing in amperes, a measure of flowability. Lower values represent better flowability
**MV is the melt viscosity (in Pa · s) at 270° C., as measured with a Contraves RM 30 plate-cone viscosimeter at shear rates of 1 sec$^{-1}$ and 10 s$^{-1}$.

The Examples show that, even in very small quantities, the low molecular weight, liquid-crystalline esters and/or ester amides to be used in accordance with the invention drastically increase the flowability of PA blends.

EXAMPLE 27

PA 46 (Stanyl®, a product of DSM) was dry-mixed with 1% of the LC ester of Example 14 and the resulting mixture compounded at 290° C. in a ZSK 53 twin-screw extruder at a throughput of 30 kg/h$^{-1}$. The energy absorption of the extruder is shown in Table 4.

The reduction in water uptake and the increase in the crystallization rate and degree of crystallization ($\Delta H_s$) of the PA by the LC additive 2) are demonstrated in Tables 5 and 6.

COMPARISON EXAMPLE 4

Example 27 was repeated in the absence of the LC ester. The energy absorption of the extruder is also shown in Table 4.

TABLE 5

| H$_2$O uptake in % after (70° C.) | Example 27 | Comp. 4 |
|---|---|---|
| 1 | 1.50 | 1.75 |
| 2 | 2.09 | 2.49 |
| 4 | 2.84 | 3.60 |
| 8 | 4.01 | 5.05 |
| 24 | 7.14 | 8.91 |
| 48 | 9.83 | 11.82 |
| 120 h | 11.04 | 12.74 |

TABLE 6

| | 1) T$_K$ [°C.] | 2) $\Delta H_S$ [J/g] | 3) t$_k$ [min] 260° C. | 265° C. |
|---|---|---|---|---|
| Ex. 27 | 242.5 | 80.2 | 0.33–0.40 | 0.95–1.0 |
| Comp. 4 | 241.7 | 76.8 | 0.36 | 1.25–1.28 |

1) Maximum of DSC crystallization exotherms during cooling from the melt (cooling rate 40° C./min.)
2) Heat of fusion as determined by DSC
3) Isothermal crystallization time as determined by DSC.

EXAMPLES 28 AND 29

The PA 6 granulate used in Example 8) was extruded in the same way with quantities of 1% (Example 28) and 3% (Example 29) of LC ester (produced in accordance with Example 14). The granulate obtained was extruded to test specimens on which the following mechanical properties were measured (see Table 7).

COMPARISON EXAMPLE 5

The properties of PA 6 without additions of LC ester were determined in the same way as in Examples 28 and 29 (see Table 7).

TABLE 7

| | Addition of LC ester | E modulus [MPa] | Ultimate tensile strength [MPa] | Impact strength a$_N$ by ISO-180/ method 1c |
|---|---|---|---|---|
| Ex. 28 | 1% | 3189 | 50.4 | 9 × unbroken 1 × 25.1 |
| Ex. 29 | 3% | 3256 | 71.4 | 9 × unbroken 1 × 316.6 |
| Comp. ex. 5 | — | 2688 | 47.8 | unbroken |

The results show that, in addition to flowability, mechanical properties, such as E modulus in tension and ultimate tensile strength, can also be improved without any reduction in impact strength by the addition in accordance with the invention of the LC flow promoters.

Further examples of the preparation of LC oligomers corresponding to formula II by melt transesterification are given in the following:

EXAMPLE 30

(Statistical LC ester (amides) according to the invention)

276.0 g p-hydroxybenzoic acid, 220.0 g hydroquinone, 488.0 g benzoic acid, 0.8 g magnesium and 624.2 g acetanhydride are weighed into a reaction vessel equipped with a stirrer, column and distillation bridge. The elimination of acetic acid began at an internal temperature of 160° C. As the distillation rate decreased, the reaction temperature was slowly increased to 250° C.

On completion of distillation, the pressure was reduced to 1 mbar over a period of 30 minutes. During the vacuum phase, residual quantities of acetic acid were eliminated over a period of 2 hours.

The product was packed in a tin can and size-reduced after cooling. Yield: 876 g.

Under a polarization microscope, a liquid-crystalline phase was detected in the range from 190 to 350° C.

EXAMPLE 31

193.2 g p-hydroxybenzoic acid, 260.4 g 4,4,-dihydroxydiphenyl, 341.6 g benzoic acid, 0.07 g magnesium and 437.0 g acetanhydride are weighed into a reaction vessel and reacted in the same way as in Example 30. Yield: 698 g.

Under a polarization microscope, a liquid-crystalline phase was detected in the range from 180 to 320° C.

EXAMPLE 32

207.0 g p-hydroxybenzoic acid, 165.0 g hydroquinone, 166.0 g isophthalic acid, 122.0 g benzoic acid, 0.06 g magnesium and 468.0 g acetanhydride are weighed into a reaction vessel and reacted in the same way as in Example 30. Yield: 560 g.

Under a polarization microscope, a liquid-crystalline phase was detected in the range from 220 to 320° C.

EXAMPLE 33

222.0 g p-methoxybenzoic acid, 265.0 g hydroquinone, 204.0 g p-methylbenzoic acid, 312.0 g acetanhydride and 0.05 g magnesium were weighed into a reaction vessel and reacted in the same way as in Example 30. Yield: 460 g.

A liquid-crystalline phase is present in the temperature range from 195 to 275° C.

EXAMPLE 34

Preparation of a low molecular weight, liquid-crystalline ester of formula (II) containing 10 aromatic partial structures by melt esterification:

3.31 kg p-hydroxybenzoic acid, 2.64 kg hydroquinone, 1.95 kg benzoic acid, 2.66 kg isophthalic acid, 7.49 kg acetanhydride and 0.91 kg magnesium powder were weighed into a 25 liter autoclave and heated to 150° C. in a stream of nitrogen (40 1 h$^{-1}$). After the temperature of 150° C. had been reached, the reaction mixture was vigorously stirred at that temperature. As the distillation rate decreased, the reaction mixture was heated in steps to 270° C. with stirring, a vacuum of 30 mbar finally being applied. The product was removed from the autoclave and size-reduced. Yield: 8.87 kg (96%).

Under a polarization microscope, the statistical compound of type II shows a liquid-crystalline phase in the range from 190 to 350° C.

EXAMPLES 35-37

Polyamide 6 granulate ($\eta_{rel}=2.9$) was compounded with quantities of 1 and 3X by weight of a statistical LC ester of formula (II) containing on average 10 aromatic partial structures based on benzoic acid (18.5% by weight) and p-hydroxybenzoic acid (31.3% by weight), hydroquinones (25% by weight) and isophthalic acid (25.2% by weight) prepared in accordance with Example 34, and the resulting mixtures processed to test specimens. The flow lengths, mechanical properties and water uptake are shown with those of the comparison in Table 8.

TABLE 8

|  |  | Ex. 35 | Ex. 36 | Ex. 37 |
|---|---|---|---|---|
| Polyamide 6 | % | 100 | 99 | 97 |
| LC ester of Example 34 | % | — | 1 | 3 |
| Flow spiral (270° C./103 bar) | cm | 56 | 68 | 91 |
| Ultimate tensile strength | MPa | 46 | 43 | 49 |
| Elongation at break | % | 116 | 61 | 51 |
| Modulus of elasticity in tension | MPa | 2827 | 2926 | 2989 |

TABLE 8-continued

|  |  | Ex. 35 | Ex. 36 | Ex. 37 |
|---|---|---|---|---|
| $\sigma_b$ 3.5% | MPa | 71 | 85 | 88 |
| $\sigma_{bB}$ | MPa | 93 | 107 | 111 |
| Outer fiber strain | % | 6.5 | 6.1 | 6.2 |
| Modulus of elasticity in bending | MPa | 2039 | 2417 | 2507 |
| $a_n$ | kJ/m$^2$ | ng | ng | ng |
| $a_k$ | kJ/m$^2$ | 3.8 | 3.9 | 3.5 |
| IZOD $a_k$ RT | kJ/m$^2$ | 7.5 | 8.7 | 8.0 |
| −30° C. | kJ/m$^2$ | 4.6 | 5.5 | 5.1 |
| HDT A | °C. | 63 | 61 | 63 |
| B | °C. | 181 | 184 | 182 |
| Water uptake 70° C./hours |  |  |  |  |
| 1 | % | 1.44 | 1.14 | 1.04 |
| 2 | % | 1.77 | 1.47 | 1.30 |
| 4 | % | 2.14 | 1.83 | 1.60 |
| 8 | % | 3.11 | 2.64 | 2.29 |
| 24 | % | 7.07 | 6.26 | 5.34 |
| 48 | % | 9.13 | 8.20 | 7.27 |
| 120 | % | 9.12 | 8.42 | 7.62 |

EXAMPLES 38-40

Polyamide 6 granulate ($\eta_{rel}\approx4.0$) was compounded with quantities of 1 and 3% by weight 4-benzoyloxy benzoic acid4-(4-benzoyloxy)-phenyl ester (LC ester no. 5).

The flow lengths, mechanical properties and water uptake are shown in Table 9.

TABLE 9

|  |  | Ex. 38 | Ex. 39 | Ex. 40 |
|---|---|---|---|---|
| Polyamide 6 | % | 100 | 99 | 97 |
| LC ester No. 5 | % | — | 1 | 3 |
| Flow spiral (270° C./103 bar) | cm | 27 | 32 | 93 |
| Ultimate tensile strength | MPa | 46 | 50 | 43 |
| Elongation at break | % | 203 | 200 | 70 |
| Modulus of elasticity in tension | MPa | 2737 | 2856 | 2950 |
| $\sigma_b$ 3.5% | MPa | 65 | 65 | 66 |
| $\sigma_{bB}$ | MPa | 87 | 85 | 89 |
| Outer fiber strain | % | 6.6 | 6.7 | 6.8 |
| Modulus of elasticity in bending | MPa | 1855 | 1846 | 1913 |
| IZOD $a_k$ RT | kJ/m$^2$ | 7.7 | 7.3 | 6.3 |
| −30° C. | kJ/m$^2$ | 3.9 | 4.7 | 5.0 |
| HDT A | °C. | 60 | 58 | 62 |
| B | °C. | 174 | 186 | 178 |
| Water uptake 70° C./hour |  |  |  |  |
| 1 | % | 1.66 | 0.98 | 0.78 |
| 2 | % | 2.00 | 1.40 | 1.03 |
| 4 | % | 2.36 | 1.77 | 1.31 |
| 8 | % | 3.19 | 2.60 | 1.92 |
| 24 | % | 7.64 | 7.01 | 5.26 |
| 48 | % | 9.76 | 9.02 | 7.33 |
| 120 | % | 9.70 | 8.98 | 7.54 |

EXAMPLES 41-43

50% Glass-fiber-reinforced polyamide 6 compounds modified with 1% by weight and 3% by weight 4-benzoyloxy benzoic acid-4-(4-benzoyloxy)-phenyl ester (LC ester no. 5) were prepared. The flow lengths, mechanical properties and water uptake are shown in Table 10.

TABLE 10

|  | | Ex. 41 | Ex. 42 | Ex. 43 |
|---|---|---|---|---|
| Polyamide 6/50% GF | % | 100 | 99 | 97 |
| LC ester No. 5 | % | — | 1 | 3 |
| Flow spiral (270° C./103 bar) | cm | 26 | 44 | 93 |
| Ultimate tensile strength | MPa | 197 | 202 | 208 |
| Elongation at break | % | 3.4 | 3.2 | 2.4 |
| Modulus of elasticity in tension | MPa | 14972 | 15105 | 15534 |
| $\sigma_b$ 3.5% | MPa | 315 | 314 | 334 |
| $\sigma_{bB}$ | MPa | 339 | 337 | 341 |
| Outer fiber strain | % | 4.5 | 4.4 | 3.7 |
| Modulus of elasticity in bending | MPa | 11876 | 11600 | 11957 |
| $a_n$ | kJ/m² | 59 | 63 | 38 |
| $a_k$ | kJ/m² | 19.4 | 15.2 | 13.9 |
| IZOD $a_k$ RT | kJ/m² | 20.6 | 18.2 | 13.3 |
| −30° C. | kJ/m² | 15.7 | 14.8 | 12.4 |
| HDT A | °C. | 210 | 209 | 211 |
| B | °C. | 222 | 220 | 217 |
| Water uptake 70° C./hour | | | | |
| 1 | % | 0.58 | 0.35 | 0.29 |
| 2 | % | 0.73 | 0.48 | 0.39 |
| 4 | % | 0.91 | 0.61 | 0.50 |
| 8 | % | 1.30 | 0.94 | 0.70 |
| 24 | % | 2.81 | 2.27 | 1.76 |
| 48 | % | 3.87 | 3.20 | 2.58 |
| 120 | % | 4.08 | 3.60 | 2.97 |

EXAMPLES 44–46

40% Mineral-reinforced polyamide 6 compounds modified with 1% by weight and 3% by weight 4-benzoyloxy benzoic acid-4-(4-benzoyloxy)-phenyl ester (LC ester no. 5) were prepared. The flow lengths, mechanical properties and water uptake are shown in Table 10.

TABLE 11

|  | | Ex. 44 | Ex. 45 | Ex. 46 |
|---|---|---|---|---|
| Polyamide 6/40% MF | % | 100 | 99 | 97 |
| LC ester No. 5 | % | — | 1 | 3 |
| Flow spiral (270° C./103 bar) | cm | 28 | 34 | 87 |
| Ultimate tensile strength | MPa | 86 | 88 | 92 |
| Modulus of elasticity in tension | MPa | 5770 | 5944 | 6257 |
| $\sigma_b$ 3.5% | MPa | 115 | 116 | 125 |
| $\sigma_{bB}$ | MPa | 128 | 129 | 138 |
| Outer fiber strain | % | 7.3 | 6.0 | 5.5 |
| Modulus of elasticity in bending | MPa | 4248 | 4265 | 4580 |
| IZOD $a_k$ RT | kJ/m² | 7.8 | 6.8 | 4.3 |
| −30° C. | kJ/m² | 5.7 | 6.2 | 3.7 |
| Water uptake 70° C./hours | | | | |
| 1 | % | 0.69 | 0.43 | 0.40 |
| 2 | % | 0.84 | 0.58 | 0.53 |
| 4 | % | 1.18 | 0.73 | 0.68 |
| 8 | % | 1.65 | 1.21 | 0.99 |
| 24 | % | 3.75 | 2.97 | 2.56 |
| 48 | % | 5.18 | 4.46 | 3.79 |
| 120 | % | 5.33 | 5.15 | 4.45 |

COMPARISON EXAMPLES 6+7

Polyamide 6 granulate modified with 3% dibenzoyl hydroquinone

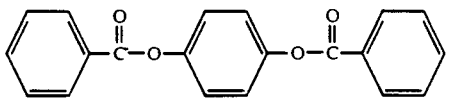

(non-liquid-crystalline) and pure polyamide 6 granulate were extruded in the same way as in Examples 2–4. The melt viscosity of both samples was substantially identical.

We claim:

1. Free-flowing polyamide molding compounds and blends which comprise a mixture of
   i) 85 to 99.9% by weight polyamides,
   ii) 0.1 to 15% by weight, based on the total weight of i) and ii), of special low molecular weight, liquid-crystalline esters and/or ester amides corresponding to formula (II) with statistical distribution of the structural units

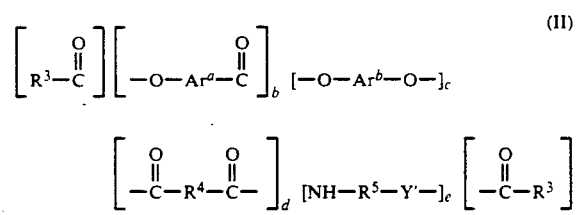

in which $R^3$ is alkyl or an optionally substituted aryl;

$Ar^a$ is a difunctional, optionally substituted mononuclear or polynuclear aromatic radical containing 6 to 24 carbon atoms;

$Ar^b$ is a difunctional, optionally substituted, mononuclear or polynuclear aromatic radical containing 6 to 30 atoms;

$R^4$ and $R^5$ represent an optionally substituted, difunctional mononuclear or polynuclear aromatic radical containing 6 to 24 carbon atoms;

Y' represents —O—,

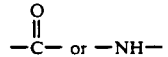

and wherein Y' is bonded to a terminal group

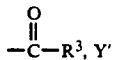

represents the —O— or —NH—;
b is 0 to 10;
C is 1 to 9;
d is 0 to 9;
e is 0 to 3 and wherein the terminal groups are formed by structural elements

and wherein
the average molecular weight Mn of the compounds corresponding to formula (II) is no greater than 4,000 with the proviso that (II) containing 7–25 aromatic partial structures, and iii) from 0.001 to 150% by weight, based on the total weight of components i) and ii). of additives comprising glass fibers, aramide-fibers, carbon fibers, plasticizers, antioxydants, pigments, dyes, weathering stabilizers, lubricants, flow aids, mold release agents, additives which reduce water absorption, flame proofing agents or polymeric blending components.

2. Free-flowing polyamide molding compounds and blends as claimed in claim 1, characterized in that the additives according to formula (II) are prepared from 4-hydroxy-3-methylbenzoic acid, 4-hydroxy-3-methoxy benzoic acid, 4-hydroxybenzoic acid, 3-hydroxybenzoic acid, 6-hydroxy-2-naphthoic acid, hydroquinone, 4,4'-dihydroxydiphenyl, 4,4'-dihydroxydiphenyl ether, 4,4'-dihydroxydiphenyl ethane, 4,4'-dihydroxydiphenoxy ethane, 3,5'-dihydroxydiphenyl, 3,5'-dihydroxydiphenyl ether 1,5-dihydroxy naphthalene, 2,-dihydroxy naphthalene, 1,4-dihydroxy naphthalene, methyl hydroquinone, phenyl hydroquinone, 2,2'-dimethyl-4,4'-dihydroxydiphenyl, 3,3',5,5'-tetramethyl-4,4'-dihydroxydiphenyl, 1,2-(2-chloro-4-hydroxyphenoxy)-ethane,4-methoxy-2,6-dihydroxynaphthalene, resorcinol, 3,4'-dihydroxydiphenyl, 1,6-dihydroxynaphthalene 1,7-dihydroxynaphthalene, 2,7-dihydroxynaphthalene 4-chlororesorcinol, 4-phenylresorcinol, 4-ethoxyresorcinol, 2,5-dichloro-1,6-dihydroxynaphthalene and 4-methoxy-2,7-dihydroxynaphthalene, 1,4-naphthalenedicarboxylic acid, 1,5-naphthalenedicarboxylic acid, 2,6-naphthalenedicarboxylic acid, biphenyl-4,4'-dicarboxylic acid, biphenyl3,3,-dicarboxylic acid, diphenoxyethane-4,4'-dicarboxylic acid, diphenylether-4,4'-dicarboxylic acid, methylterephthalic acid, methoxy terephthalic acid, chloroterephthalic acid, 4-chloronaphthalene-2,7-dicarboxylic acid, 2,6- or 2,7-naphthalenedicarboxylic acid, biphenyl-3,4'-dicarboxylic acid, 4-methylisophthalic acid, 5-methylisophthalic acid, diphenylether-4,4'-dichloro-3,3'-dicarboxylic acid. isophthalic and terephthalic acid, ε-aminocaproic acid or caprolactam, ω-aminoundecanoic acid, ω-aminododecanoic acid or lauric lactam, 4-aminocyclohexyl carboxylic acid, 4-aminobenzoic acid, 6-amino-2-naphthoic acid, 3-aminophenol 4-aminophenol, 3-amino-2-methyl phenol, 3-amino-4-methyl phenol, 5-amino-1-naphthol, 6-amino-1-naphthol, 5-amino-2-naphthol, 7-amino-2-naphthol, 8-amino-2-naphthol, 6-amino2-naphtol and 4'-amino-1-hydroxybiphenyl, oxalic acid, succinic acid, adipic acid, suberic acid, azelaic acid, trimethyl adipic acid, sebacic acid, dodecanedioic acid, dimeric fatty acids, 1,4-cyclohexanedicarboxylic acid, benzoic acid, 4-methylbenzoic acid, 4-methoxybenzoic acid 4-biphenyl carboxylic acid, hydroquinone,4,4'-dihydroxy biphenyl, 4-aminophenol, 3-aminophenol, 4'-amino-1-hydroxy biphenyl, 4-hydroxybenzoic acid, 3-hydroxybenzoic acid, 6-hydroxy-2-naphthoic acid, isophthalic acid, terephthalic acid, oxalic acid, adipic acid, sebacic acid and dimeric fatty acids, 4-aminobenzoic acid and 6-amino-2-naphthoic acid, ε-aminocaproic acid or caprolactam, benzoic acid, 4-methylbenzoic acid and 4-biphenyl carboxylic acid, the additives corresponding to formula (II) containing 7 to 20 aromatic partial structures.

3. Free-flowing polyamide molding compounds and blends as claimed in claim 1, characterized in that polyamide 6, 66, 46, 610, 11, 12, 1012, 1212, 616, 6I, 6T6, 6/66 copolyamides, copolyamides of caprolactam, isophthalic acid and isophorone diamine, copolyamides of isophthalic acid (+optionally terephthalic acid), azelaic acid and 4,4'-diaminodicyclohexyl methane (or isomer mixtures) are used, individually or in admixture, as polyamide components.

4. Polyamide blends as claimed in claim 1, wherein diene rubbers, acrylate rubbers, polyethylene, polypropylene, ethylene/ propylene copolymers, ethylene/1-butene copolymers, ethylene/propylene/diene terpolymers, ethylene and/or $ propylene/acrylic (ester) copolymers, ethylene/vinyl acetate copolymers, polyoctenylenes, polystyrenes, (2-methyl)styrene/(meth)acrylonitrile copolymers, (meth)acrylonitrile;butadiene (2-methyl)styrene polymers (ABS), high-impact polystyrenes, polycarbonates, aromatic polyester (carbonates), polyesters, polysulfones, polyphenylene oxides, polyether ketones, polyether sulfones, polyether ether ketones, polyether imides, polyester imides, polyamide imides and polyimides are used as polymeric blending components and low molecular weight and;or polymeric compatibility promoters are optionally present.

5. Moldings, films, fibers and other articles of the polyamide molding compounds and blends claimed in claim 1.

6. Free-flowing polyamide molding compounds and blends as claimed in claim 1 wherein glass fibers, aramide fibers, carbon fibers, glass beads, SiO, chalk $TiO_2$, talcum kaolin,. mica, $TiO_2$, plasticizers, antioxidants, pigments, dyes, weathering stabilizers, lubricants, flow aids, mold release agents, nucleating agents, additives which reduce water absorption comprising monophenols, bisphenols or (alkyl)phenol-formaldehyde condensates, flameproofing agents, or polymeric blending components comprise additives iii).

7. A process for the production of the polyamide molding compounds and blends claimed in claim 1 wherein at least one polyamide, at least one liquid-crystalline additive (II) ii) and at lest one polymeric blending component as additive iii) for the production of polyamide blends are mixed in the melt, in extruders, or in a mold.

8. Free-flowing polyamide molding compounds and blends as claimed in claim 1 wherein compounds corresponding to formula (II) have an average molecular weight Mn no greater than 2,500.

* * * * *